US007734913B2

(12) United States Patent
Morino et al.

(10) Patent No.: US 7,734,913 B2

(45) Date of Patent: Jun. 8, 2010

(54) CONTENT TRANSMISSION CONTROL DEVICE, CONTENT DISTRIBUTION DEVICE AND CONTENT RECEIVING DEVICE

(75) Inventors: Harumi Morino, Yokohama (JP); Masataka Okayama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1310 days.

(21) Appl. No.: 11/051,290

(22) Filed: Feb. 4, 2005

(65) Prior Publication Data

US 2005/0216730 A1 Sep. 29, 2005

(30) Foreign Application Priority Data

Feb. 13, 2004 (JP) ............................ 2004-036008

(51) Int. Cl.
*H04L 29/08* (2006.01)
*H04L 29/12* (2006.01)
*H04N 7/16* (2006.01)

(52) U.S. Cl. ......................... 713/161; 713/160; 726/30

(58) Field of Classification Search ................. 713/160, 713/161; 726/30
See application file for complete search history.

(56) References Cited

U.S. PATENT DOCUMENTS 5,949,877 A * 9/1999 Traw et al. .................. 713/171
6,092,191 A * 7/2000 Shimbo et al. .............. 713/153
6,738,349 B1 * 5/2004 Cen ........................... 370/231
7,370,112 B2 * 5/2008 Saito et al. .................. 709/229

OTHER PUBLICATIONS

Head, Will. "IDF: DTCP over IP, New-look content distribution", Sep. 2003.*
DTCP. "DTCP vol. 1, Supplement E, Mapping DTCP to IP, (Informational Version)", Nov. 2003.*
DTCP. "Digital Transmission Content Protection Specification, vol. 1 (Informational Version)", Nov. 2003.*
Zapata, Manel Guerrero, et al. "Securing Ad hoc Routing Protocols", Sep. 2002.*
Hitachi, Ltd., et al., "DTCP vol. 1, Supplement E Mapping DTCP to IP (Informational Version)", Draft Revision 0.9, Sep. 12, 2003, 1997-2003, 19 pages.

* cited by examiner

*Primary Examiner*—Michael J Simitoski
(74) *Attorney, Agent, or Firm*—Townsend and Townsend and Crew LLP

(57) ABSTRACT

A delivery of content to the unspecified number of persons is prevented by limiting the content delivery range. A delivery source terminal 110 generates an authentication code based on the number of possible transmission times of content and an authentication code key 116, and configures the number of possible transmission times and the generated authentication code in a packet. The delivery source terminal 110 transmits the packet to a delivery destination terminal 130. A router 120 verifies whether the authentication code generated based on the number of possible transmission times and the authentication code key 124 that are received agrees with the authentication code received from the delivery source terminal 110, updates the number of possible transmission times when the two codes agree, generates a new authentication code, and configures it in the packet. The router 120 transmits the packet thus generated to the delivery destination terminal 130.

5 Claims, 9 Drawing Sheets

110
DELIVERY SOURCE TERMINAL
116
AUTHENTICATION CODE KEY
112
PACKET CREATION UNIT
114
CONTENT ENCRYPTION UNIT
115
CONTENT
111
DELIVERY CONTROLLER
113
DEVICE AUTHENTICATION CONTROLLER
101
120
ROUTER
124
AUTHENTICATION CODE KEY
123
AUTHENTICATION CODE GENERATION & VERIFICATION UNIT
121
ROUTING CONTROLLER
122
ROUTING TABLE
102
130
DELIVERY DESTINATION TERMINAL

10
DELIVERY SOURCE TERMINAL
11
DELIVERY CONTROLLER
12
PACKET CREATION UNIT
13
DEVICE AUTHENTICATION CONTROLLER
14
CONTENT ENCRYPTION UNIT
15
CONTENT
1
20
ROUTER
21
ROUTING CONTROLLER
22
ROUTING TABLE
2
30
DELIVERY DESTINATION TERMINAL 241 242 243 244 223

| AUTHENTICATION CODE IDENTIFIER | DATA SIZE | TTL AUTHENTICATION CODE | OPTIONAL DATA |
|---|---|---|---|

241 242 243 245 203

| AUTHENTICATION CODE IDENTIFIER | DATA SIZE | TTL AUTHENTICATION CODE | DATA |
|---|---|---|---|

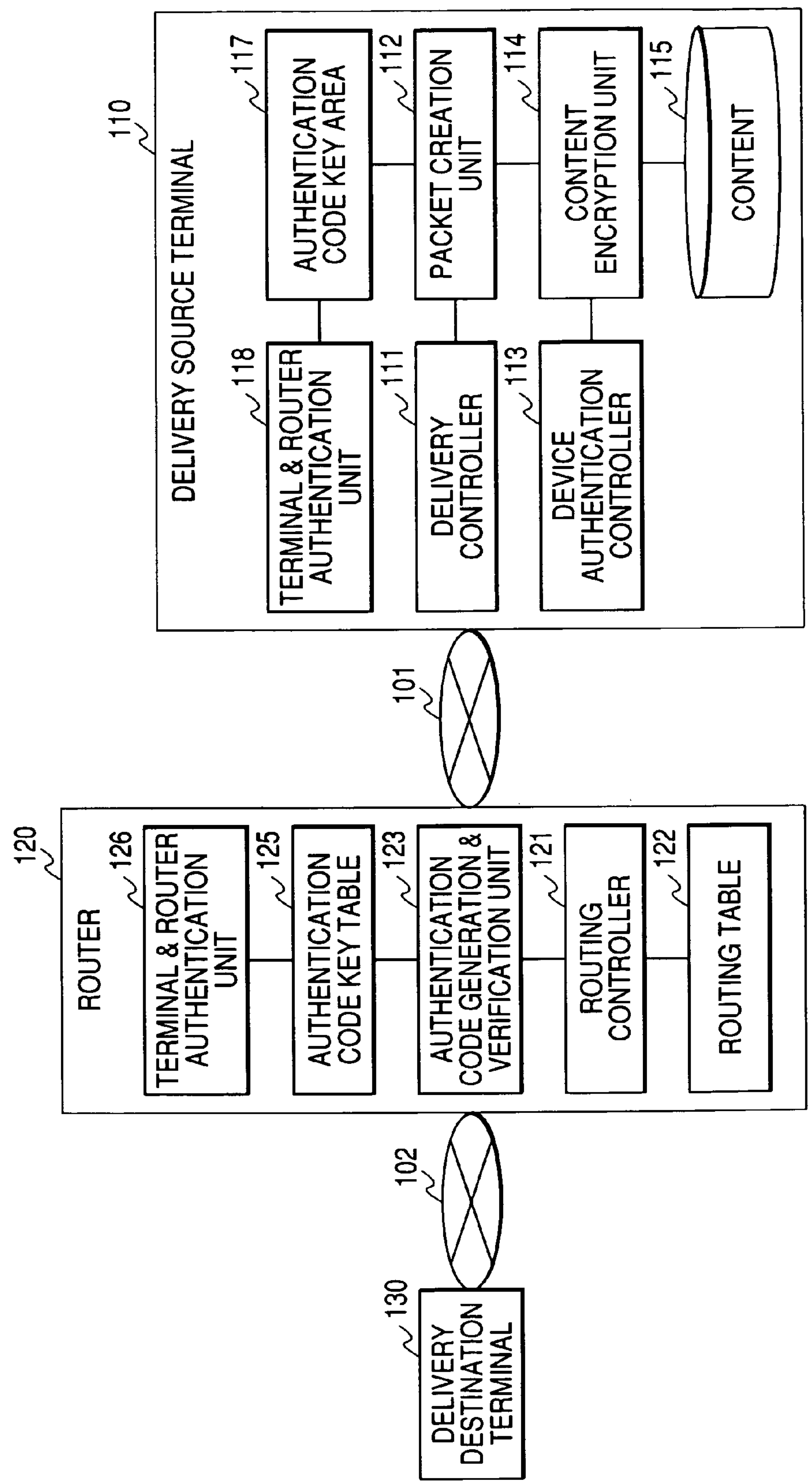

FIG. 8
110
DELIVERY SOURCE TERMINAL
117
AUTHENTICATION CODE KEY AREA
112
PACKET CREATION UNIT
114
CONTENT ENCRYPTION UNIT
115
CONTENT
118
TERMINAL & ROUTER AUTHENTICATION UNIT
111
DELIVERY CONTROLLER
113
DEVICE AUTHENTICATION CONTROLLER
101
120
ROUTER
126
TERMINAL & ROUTER AUTHENTICATION UNIT
125
AUTHENTICATION CODE KEY TABLE
123
AUTHENTICATION CODE GENERATION & VERIFICATION UNIT
121
ROUTING CONTROLLER
122
ROUTING TABLE
102
130
DELIVERY DESTINATION TERMINAL

FIG. 9

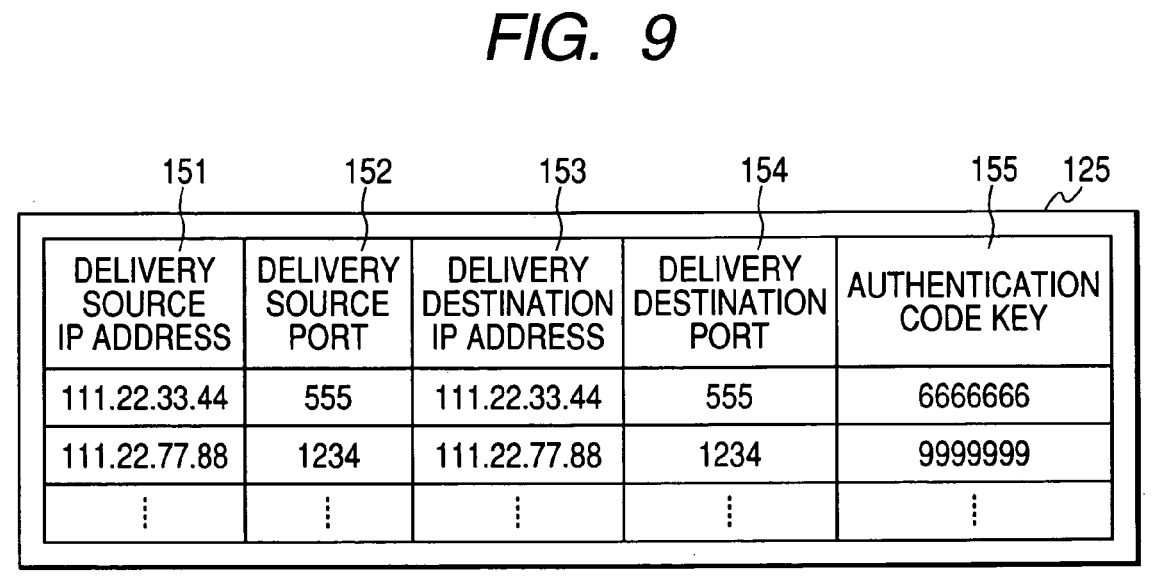

| DELIVERY SOURCE IP ADDRESS | DELIVERY SOURCE PORT | DELIVERY DESTINATION IP ADDRESS | DELIVERY DESTINATION PORT | AUTHENTICATION CODE KEY |
|---|---|---|---|---|
| 111.22.33.44 | 555 | 111.22.33.44 | 555 | 6666666 |
| 111.22.77.88 | 1234 | 111.22.77.88 | 1234 | 9999999 |
| ⋮ | ⋮ | ⋮ | ⋮ | ⋮ |

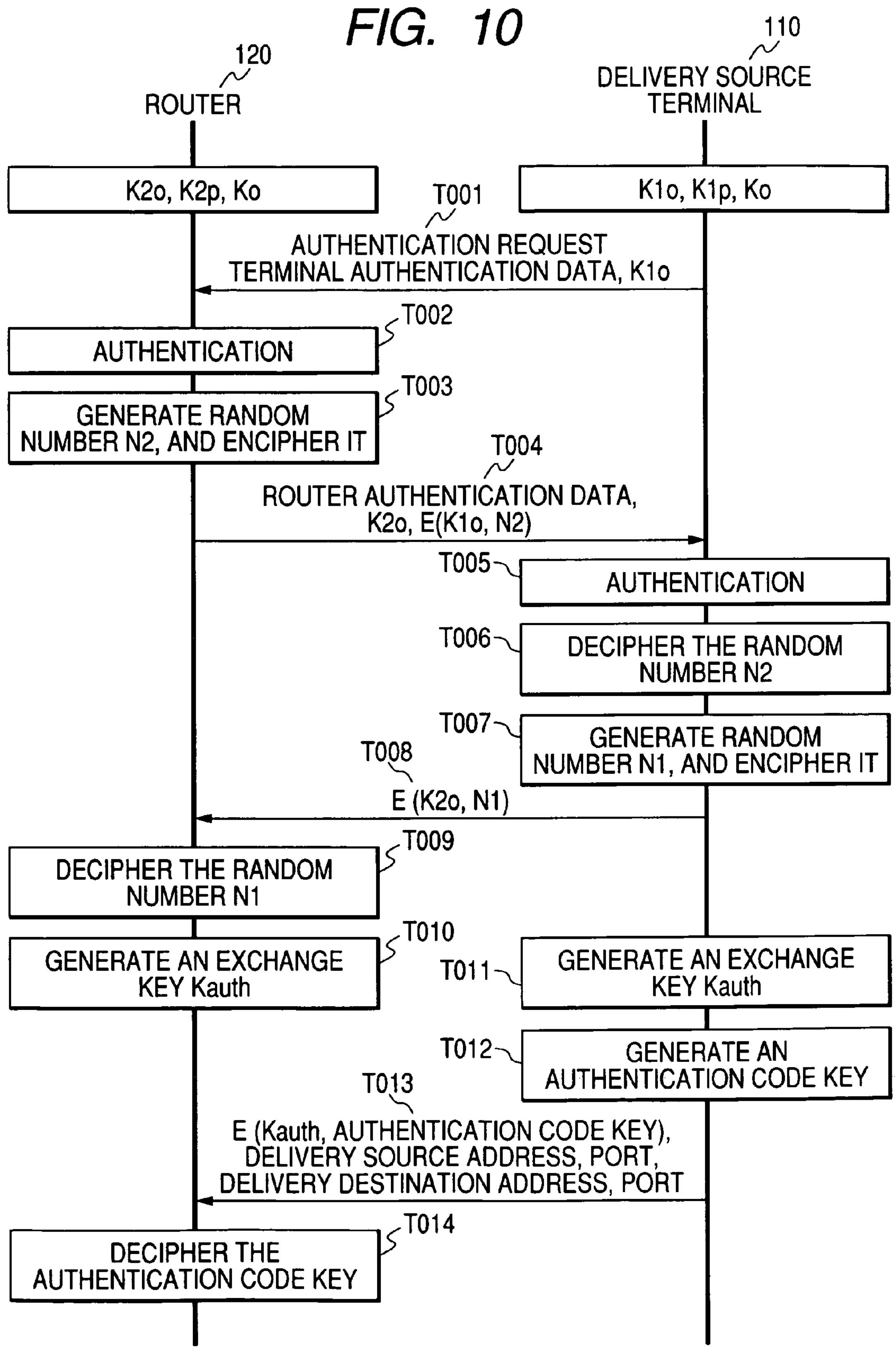
FIG. 10
120
ROUTER
110
DELIVERY SOURCE TERMINAL
K2o, K2p, Ko
K1o, K1p, Ko
T001
AUTHENTICATION REQUEST TERMINAL AUTHENTICATION DATA, K1o
T002
AUTHENTICATION
T003
GENERATE RANDOM NUMBER N2, AND ENCIPHER IT
T004
ROUTER AUTHENTICATION DATA, K2o, E(K1o, N2)
T005
AUTHENTICATION
T006
DECIPHER THE RANDOM NUMBER N2
T007
GENERATE RANDOM NUMBER N1, AND ENCIPHER IT
T008
E (K2o, N1)
T009
DECIPHER THE RANDOM NUMBER N1
T010
GENERATE AN EXCHANGE KEY Kauth
T011
GENERATE AN EXCHANGE KEY Kauth
T012
GENERATE AN AUTHENTICATION CODE KEY
T013
E (Kauth, AUTHENTICATION CODE KEY), DELIVERY SOURCE ADDRESS, PORT, DELIVERY DESTINATION ADDRESS, PORT
T014
DECIPHER THE AUTHENTICATION CODE KEY

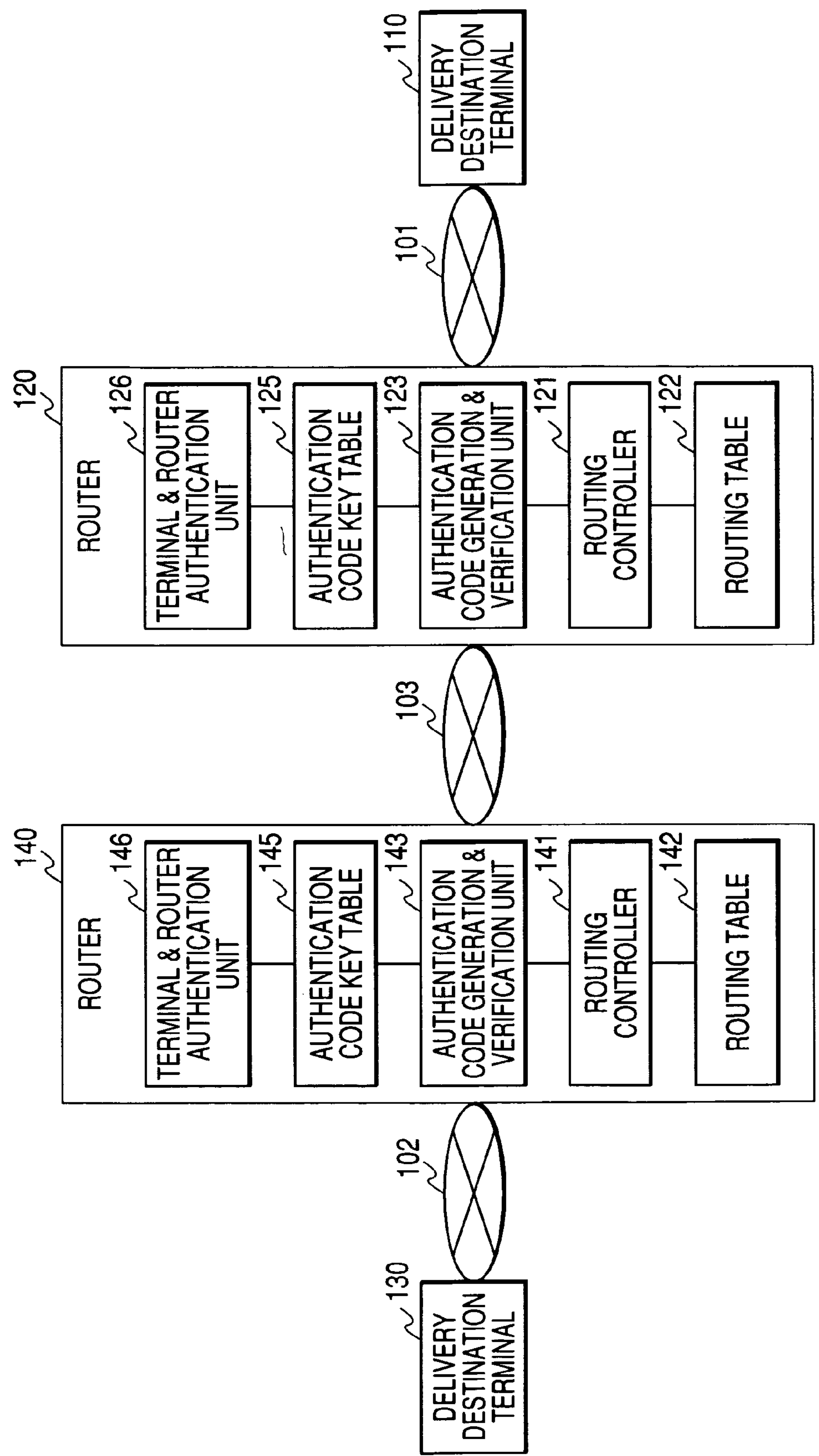
FIG. 11
DELIVERY DESTINATION TERMINAL
110
101
120
ROUTER
126
TERMINAL & ROUTER AUTHENTICATION UNIT
125
AUTHENTICATION CODE KEY TABLE
123
AUTHENTICATION CODE GENERATION & VERIFICATION UNIT
121
ROUTING CONTROLLER
122
ROUTING TABLE
103
140
ROUTER
146
TERMINAL & ROUTER AUTHENTICATION UNIT
145
AUTHENTICATION CODE KEY TABLE
143
AUTHENTICATION CODE GENERATION & VERIFICATION UNIT
141
ROUTING CONTROLLER
142
ROUTING TABLE
102
130
DELIVERY DESTINATION TERMINAL

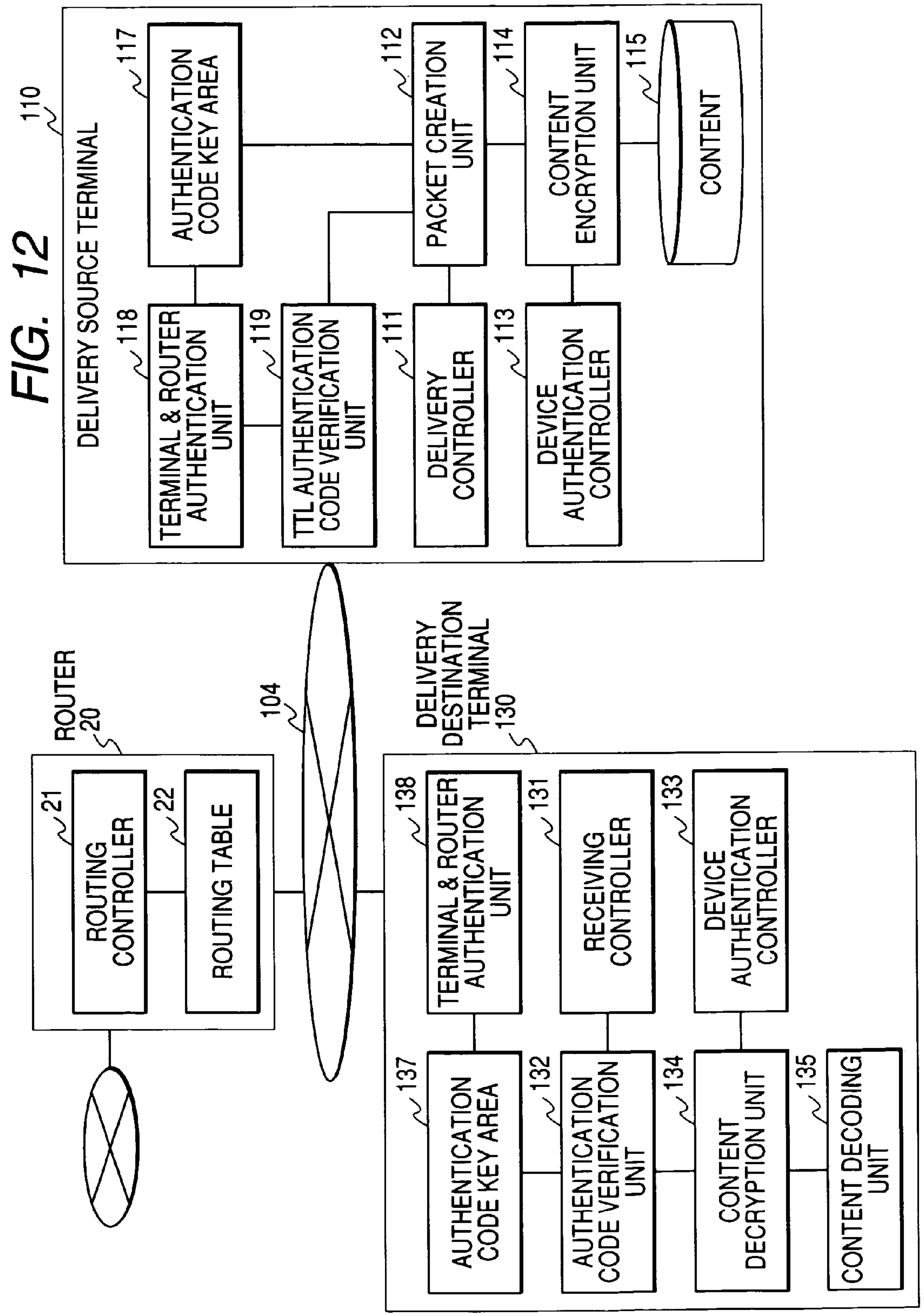
FIG. 12
DELIVERY SOURCE TERMINAL
110
117
AUTHENTICATION CODE KEY AREA
118
TERMINAL & ROUTER AUTHENTICATION UNIT
119
TTL AUTHENTICATION CODE VERIFICATION UNIT
112
PACKET CREATION UNIT
111
DELIVERY CONTROLLER
114
CONTENT ENCRYPTION UNIT
113
DEVICE AUTHENTICATION CONTROLLER
115
CONTENT
ROUTER
20
21
ROUTING CONTROLLER
22
ROUTING TABLE
104
DELIVERY DESTINATION TERMINAL
130
138
TERMINAL & ROUTER AUTHENTICATION UNIT
131
RECEIVING CONTROLLER
133
DEVICE AUTHENTICATION CONTROLLER
137
AUTHENTICATION CODE KEY AREA
132
AUTHENTICATION CODE VERIFICATION UNIT
134
CONTENT DECRYPTION UNIT
135
CONTENT DECODING UNIT

CONTENT TRANSMISSION CONTROL DEVICE, CONTENT DISTRIBUTION DEVICE AND CONTENT RECEIVING DEVICE

CLAIM OF PRIORITY

The present application claims priority from the Japanese patent application JP2004-036008 filed on Feb. 13, 2004, the content of which is hereby incorporated by reference into this application.

BACKGROUND OF THE INVENTION

The present invention relates to a technology to deliver content, and more specifically to a content transmission control device that executes routing control to limit the delivery range of content, a device to deliver content and a device to receive content.

Services to deliver content such as motion pictures and music through communication means of the Internet, satellite broadcasting, etc. have been proposed. Data handled in such services is digitized, which allows easy duplication. It is therefore important to protect copyrights of the content. As one of the protection means, a method of enciphering and delivering content has been proposed. With the method, content is enciphered, and a decryption key to decrypt the enciphered content is simultaneously generated. Since the enciphered content cannot be reproduced without the decryption key, it is possible to prevent fraudulent use of content by managing a license consisting of a pair of a decryption key and use conditions thereof, thus enabling to protect rights of copyright owners of content.

In addition, when delivered on the Internet, content is delivered via a plurality of networks. Such networks are connected to each other via respective devices called “router” which controls data transmission. The content issued from a device is delivered to a receiving terminal through a plurality of routers and networks. Content is delivered through the Internet as described above. On the other hand, however, it becomes possible for a user to record digital broadcast content, etc. and deliver the content to the unspecified number of persons. Under such circumstances, requests for limiting the use of content to users who duly purchased the content are being proposed by content holders, etc.

For example, to prevent delivery of content to the unspecified number of persons, an idea to limit the number of times that content passes through a router has been proposed (see Non-patent Document 1). Hereinafter, operations of the proposed system will be described with reference to FIG. 2. Here, consideration will be made on a case where content is delivered to a delivery destination terminal 30 connected to a delivery destination network 2 from a delivery source terminal 10 connected to a delivery source network 1. First, a device authentication controller 13 of the delivery source terminal 10 checks if the delivery destination terminal 30 is a right device, exchanges information used to generate a content encryption key with the delivery destination terminal 30, and shares an encryption key with the delivery destination terminal 30. In addition, the delivery destination terminal 30 checks if the delivery source terminal 10 is a right device, as required. When the delivery destination terminal 30 is verified to be a right device, delivery of the content is practically initiated. If it is judged that the delivery destination terminal 30 is not a right device, the content will not be delivered.

To deliver content, a content encryption unit 14 executes the following steps of: generating a key to encrypt content by using information for generating a key to encrypt the shared content; encrypting content to be delivered by using the encryption key, creating a packet in which the delivery destination address on network and the port, the delivery source address and the port, the maximum number of times that the content passes through the router (hereinafter referred to as TTL: Time to Live), etc. are configured in header; and delivering the encrypted content to the delivery source network 1 via a delivery controller 11. A router 20 refers to the delivery destination address of the packet, detects that the address is an address managed by the delivery destination network 2, and delivers the packet to the delivery destination network 2. The delivery destination terminal 30, upon confirming that the packet is addressed to the delivery destination terminal 30, receives the packet, generates a content encryption key by using information for generating a shared key to encrypt the content, decrypts the encrypted content by using the key, and uses the content.

Hereinafter, operations of the router 20 will be described in detail. When the router 20 receives the packet sent by the delivery source terminal 10, a routing controller 21 judges, by referring to a routing table 22, if transmission of the packet which has a delivery destination address and a port, and a delivery source address and a port that are stored in the header of the packet has been permitted or prohibited. If transmission has been permitted, the routing controller 21 subtracts “1” from the value stored in TTL of the header and updates the TTL, thus showing that the packet has passed the router. Here, if subtraction of “1” from the TTL value results in “0”, the routing controller 21 does not allow the packet to pass through the router even if transmission of packets is permitted and notify the delivery source terminal 10 of the status accordingly. When subtraction of “1” from the TTL value results in a value exceeding “0”, the routing controller 21 transmits the packet to the delivery destination network 2. In addition, when transmission of the packet is prohibited in the routing table 22, the packet will not be transmitted to the delivery destination network 2.

As stated above, by limiting the value that is configured for TTL by the packet creation unit 12 of the delivery source terminal 10, it is possible to limit and determine the network through which content is delivered, thus enabling to prevent delivery of content to the unspecified number of persons. In addition, in non-patent document 1, the TTL value should be set to “3” or below. More specifically, the number of routers through which content can pass is limited up to 2.

With the content delivery system stated above, a method of managing TTL values with the delivery source terminal 10 or the router 20 constitutes an important factor.

[Non-Patent Document 1] DTCP Volume 1, Supplement E, “Mapping DTCP to IP” (Informational Version), DRAFT Revision 0.9, Sep. 12, 2003 (pp. 18, V1SE.6.2).

SUMMARY OF THE INVENTION

According to the above-described conventional art, even if a delivery source terminal and a delivery destination terminal are right devices, when a router which connects the devices with networks has fraudulently changed and set TTL values to a larger value, any delivery destination terminal becomes able to receive content whenever the terminal is connected to the Internet, thus enabling delivery of content to the unspecified number of persons. When the router is manufactured as a device dedicated to that purpose, it is comparatively difficult to change TTL values. However, for personal computers (PCs) incorporating a general-purpose OS, such changes can be made with relative ease. For example, a router changes a delivery source address contained in the header of a packet to a global address when the delivery source address is of a private address. In this way, for a router, it is possible to change information contained in the header. More specifically, even when content is encrypted based on the shared data and delivered safely, a change in header data of a packet enables delivery of the content to the unspecified number of persons, and thus limiting the number of routers through which content will pass by TTL values becomes meaningless.

An object of the present invention is to provide a content transmission control device that has a means for detecting a fraudulent change in the header of a packet.

Further, another object of the present invention is to provide a content delivery terminal device and a content receiving terminal device which authenticate the content transmission control device and prevent delivery of content to the unspecified number of persons.

The content transmission control device according to the present invention verifies if an authentication code generated based on the possible number of content transmissions and an authentication code key agrees with an authentication code received from the transmission source, updates the possible number of content transmissions when the two codes agree, generates a new authentication code based on the updated possible number of content transmissions and an authentication code key, and transmits the updated possible number of content transmissions and the new authentication code to a content delivery destination.

The content delivery device according to the present invention generates an authentication code based on the possible number of content transmissions and an authentication code key and transmits the possible number of content transmissions and the generated authentication code to a content delivery destination.

In addition, the content receiving device of the present invention verifies if an authentication code generated based on the possible number of content transmissions and an authentication code key agrees with an authentication code received from the transmission source, and discards the received packet when the two codes do not agree.

According to the present invention, since the possible number of content transmissions is configured along with the corresponding authentication code in a packet, falsification of the possible number of content transmissions can be prevented while the content is being transmitted.

BRIEF DESCRIPTION OF THE DRAWINGS

FIG. 8 is a diagram showing a content delivery system configuration of a second embodiment;

FIG. 9 is a diagram showing an authentication code key table configuration of the second embodiment;

FIG. 10 is a diagram showing an authentication sequence for a case where the authentication code key of the second embodiment is transmitted;

FIG. 11 is a diagram showing a configuration example for a case where content is transmitted via a plurality of routers of the second embodiment; and FIG. 12 is a diagram showing a content delivery system configuration of a third embodiment.

DESCRIPTION OF THE PREFERRED EMBODIMENTS

Hereinafter, preferred embodiments of the present invention will be described with reference to the accompanying drawings.

First Embodiment

Figure 1:
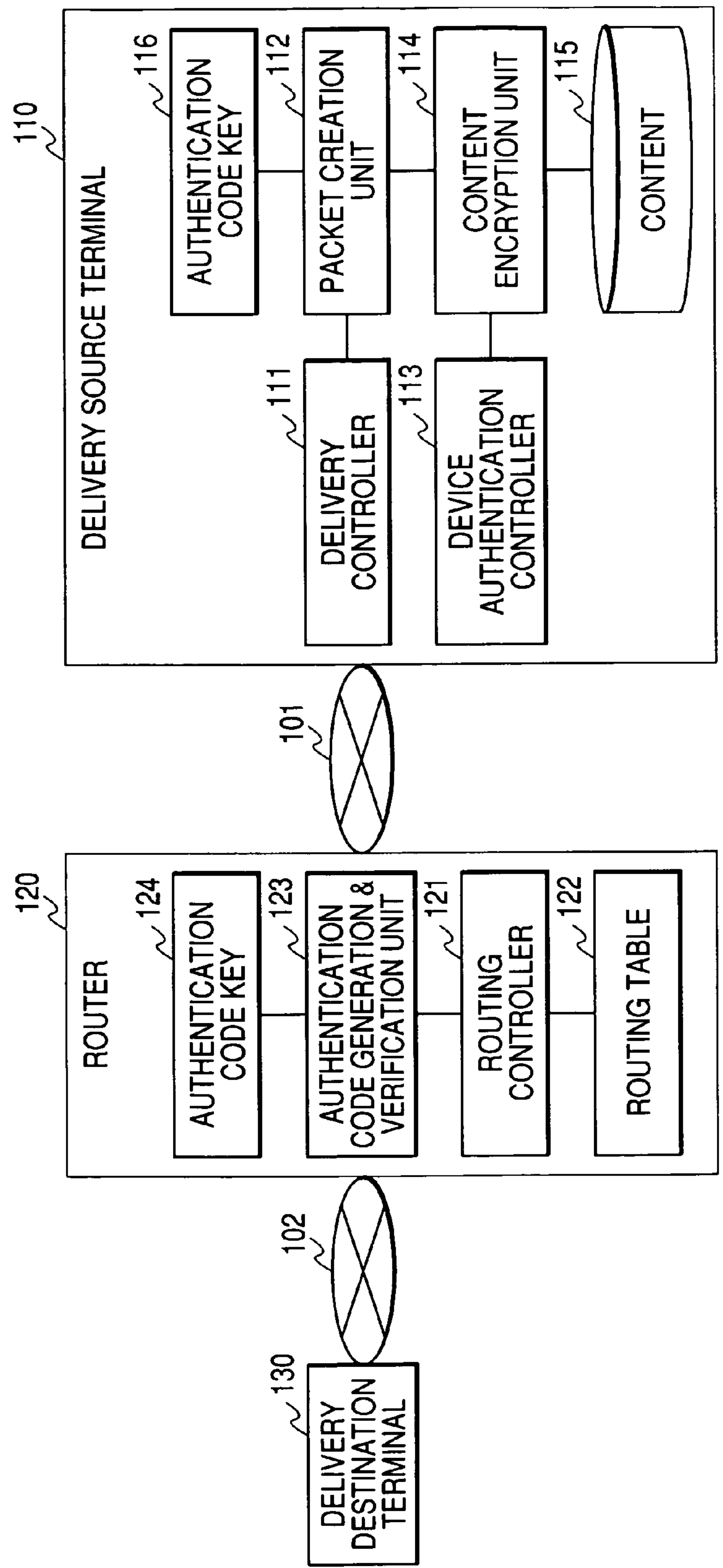
FIG. 1 is a diagram showing a content delivery system configuration of a first preferred embodiment.
Figure 2:
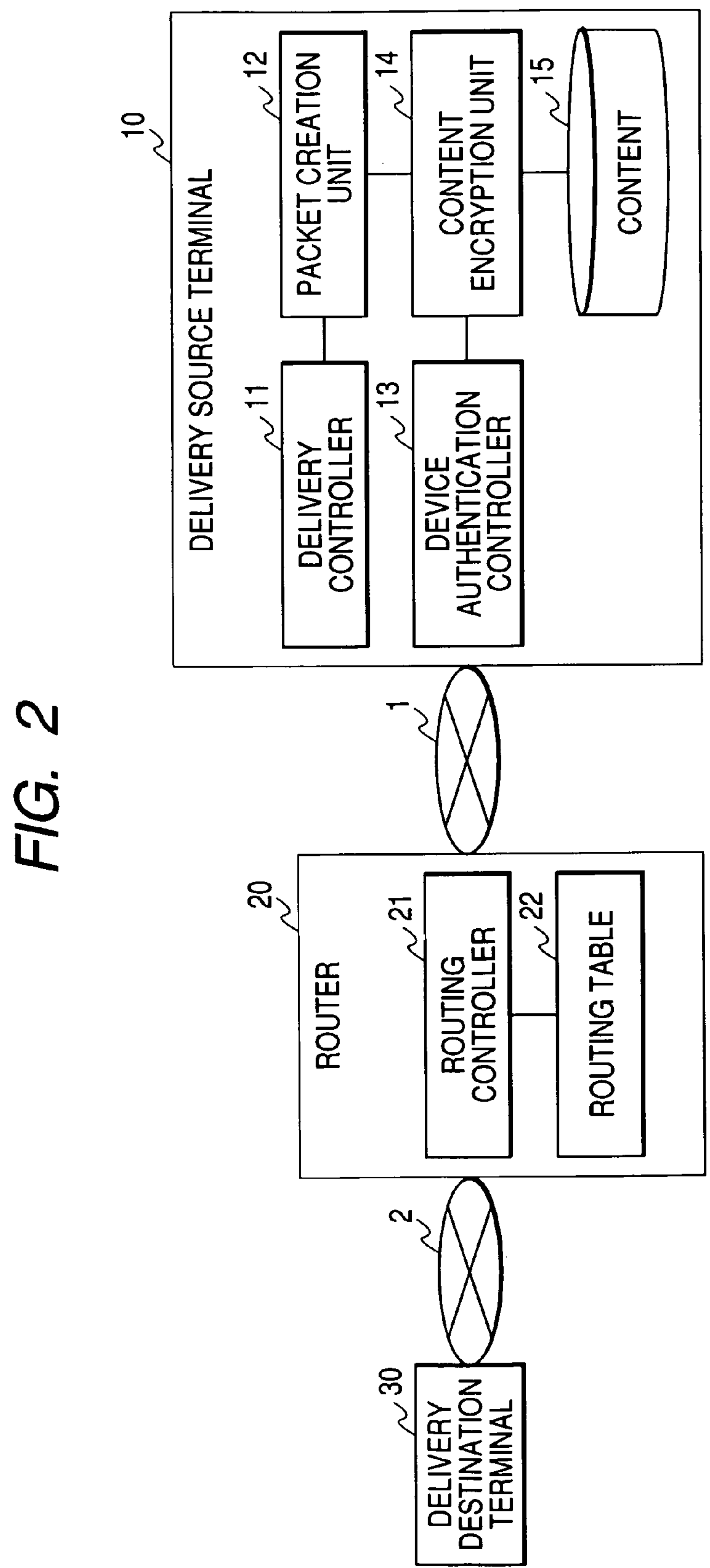
FIG. 2 is a diagram showing a configuration example of a conventional content delivery system.

FIG. 1 is a diagram showing a content delivery system configuration of a first embodiment, wherein reference numeral 101 denotes a delivery source network to which a terminal delivering content is connected; 102 a delivery destination network to which a terminal to receive the content is connected; 110 a delivery source terminal to deliver content. Reference numeral 111 denotes a delivery controller which controls delivery of content; 112 a packet creation unit which creates a packet to be transmitted to the networks; 113 a device authentication controller which authenticates a device of a delivery destination terminal; 114 content encryption unit which encrypts content to be delivered; 115 content to be delivered. Reference numeral 116 is an authentication code key which is data for creating an authentication code of TTL contained in the header. The content 115 and the authentication code key 116 are stored in a storage device. Reference numeral 120 is a router which connects networks; 121 a routing controller which controls transmission of content among networks; 122 a routing table which stores rules to permit or prohibit data transmissions among networks; and 123 an authentication code generation & verification unit which generates and verifies an authentication code. The authentication code generation & verification unit may, needless to say, be divided into an authentication code verification unit and an authentication code generation unit, for example. Reference numeral 124 is an authentication code key which is data to generate an authentication code of TTL contained in the header. The routing table 122 and the authentication code key 124 are stored in a storage device. Numeral reference 130 is a delivery destination terminal that receives content. Hereinafter, descriptions will be made by using above-stated reference numerals applied to respective components.

First, when the delivery source terminal 110 receives a request for delivery of content from the delivery destination terminal 130, the device authentication controller 113 authenticates the delivery destination terminal 130. At this time, the delivery destination terminal 130 authenticates the delivery source terminal 110, as required. When the authentication is not performed successfully, no further processes will be performed, and the content is not delivered. When the authentication is performed successfully, the device authentication controller 113 enables data for generating a key to encrypt content to be shared between the delivery destination terminal 130 and the delivery source terminal 110.

When the content is delivered, the content encryption unit 114 generates a content key to encrypt the content by using data for generating a key to encrypt the content, reads the content 115 requested, and encrypts the content by using the content key.

Next, the packet creation unit 112 generates a header to transmit the content to the networks and creates a packet. Here, the header contains data such as an address and a port of the delivery destination terminal, an address and a port of the delivery source terminal and TTL which specifies the number of routers through which the content can pass. In addition, the packet creation unit 112 generates an authentication code related to the TTL by using the authentication code key 116 and adds the authentication code to the header in order to enable detection of possible falsified TTL. Details of the header format will be described later. An authentication code is generated by using a one-way function (Hash function) for data which is obtained by coupling a TTL value and the authentication code key 116, for example. In this case, even if the algorithm of the Hash function is known, the authentication code cannot be generated unless the authentication code key is known.

When a packet is created, the delivery controller 111 transmits the packet containing the encrypted content to the delivery source network. Here, since the delivery destination terminal 130 is not connected to the delivery source network 101, the delivery controller 111 transmits the packet to the router 120.

When the router 120 receives the packet transmitted from the delivery source terminal 110, the routing controller 121 first picks up a delivery destination address and a port as well as a delivery source address and a port that are contained in the header of the packet, and checks whether transfer of the packet is permitted or prohibited by referring to the routing table 122. Here, if transfer is not permitted, the packet will not be transferred and the packet is discarded. When transfer is permitted and is not prohibited, the authentication code generation & verification unit 123 verifies the TTL value. The authentication code generation & verification unit 123 picks up the TTL value and the authentication code of the TTL from the header, and generates an authentication code by applying the Hash function to TTL and the authentication code key 124. Then, this unit 123 compares the authentication code with the TTL authentication code picked up from the packet header to verify that the two codes have the same value. Here, when the authentication code keys to be stored respectively in the router 120 and the delivery source terminal 110 are set to the same value, it is possible to check that the TTL value has not been falsified if the comparison of the two codes results in the same value. Accordingly, since there is a possibility that TTL has been falsified when the comparison reveals different values, the authentication code generation & verification unit 123 discards the received packet and does not transfer the packet.

For the case where the comparison reveals the same value, when subtraction of the TTL value by "1" results in "0", this means the content cannot pass through further routers. Then, the authentication code generation & verification unit 123 discards the packet and notifies the delivery source terminal 110 that the packet has been discarded. When the TTL value remains to be "1" or over after the subtraction, the authentication code generation & verification unit 123 newly generates a TTL authentication code by applying a Hash function to the remaining TTL value after subtraction and to the authentication code key 124, and changes the TTL in the packet header and the authentication code in the packet. The routing controller 121 transmits the packet having the TTL value and the TTL authentication code thus changed, to the delivery destination network 102. Here, the routing controller 121 may actually set the changed TTL value and the authentication code in the packet.

When the packet is sent to the delivery destination network 102, the packet is received by the delivery destination terminal 130. The delivery destination terminal 130, upon receiving the packet, generates a content key based on data for generating a key to encrypt content that is shared during the device authentication, and decrypts the encrypted content contained in the packet by using the content key to use the content.

The delivery source terminal 110, the router 120 and the delivery destination terminal 130 may each be a dedicated device having unique functions. The delivery source terminal 110 and the router 120 is each provided with a CPU and a memory, and each processing component is realized in the form of a program that is loaded into the memory and executed by the CPU. It is also possible to realize the delivery source terminal 110, the router 120 and the delivery destination terminal 130 by means of a general-purpose data processing device such as a personnel computer.

Next, a configuration of a packet to be transmitted to the networks as well as addition of authentication data of TTL that is a feature of the present invention will be described with reference to FIGS. 3 through 7.

Figure 3:
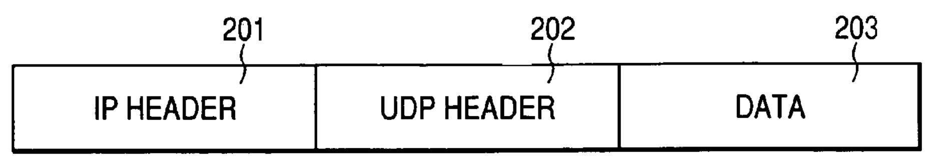
FIG. 3 is a diagram showing a configuration example of a packet that delivers content.

FIG. 3 shows an example of a packet to be transmitted by the delivery source terminal 110 to the network using the UDP/IP protocol. Reference numeral 201 denotes an IP header; 202 a UDP header; and 203 data containing encrypted content.

Figure 4:
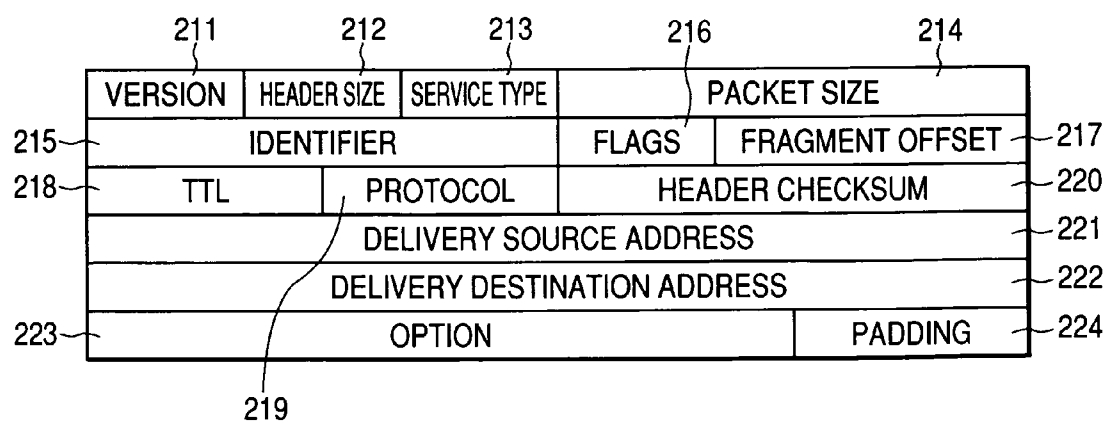
FIG. 4 is a diagram showing a header configuration of an IP packet.

FIG. 4 is a diagram showing a detailed configuration of an IP header. Reference numeral 211 denotes a version showing an IP packet version; 212 a header size showing the length of a header; 213 a service type showing priority or a type of service; and 214 a packet size showing the length of an IP packet. Reference numeral 215 denotes an identifier to be used to recombine packets when the packets are divided; 216 flags showing prohibition or continuance of division; 217 a fragment offset showing an offset of divided data. Reference numeral 218 denotes TTL showing the lifetime of a packet; 219 a protocol showing a protocol type of data; and 220 a header checksum showing a checksum of a header. Reference numeral 221 denotes a delivery source address; 222 a delivery destination address. Reference numeral 223 denotes an option which stores routing data or other optional data; 224 a padding to adjust the option to 4-byte alignment since the option size is variable.

Figures 5, 6, 7:
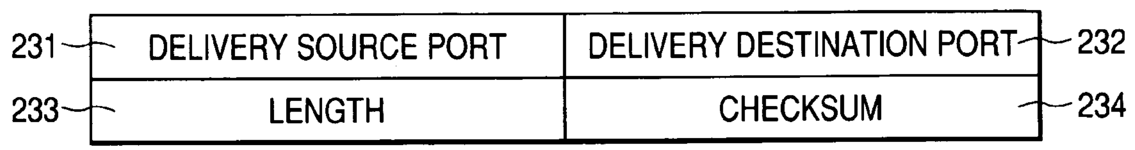
FIG. 5 is a diagram showing a header configuration of a UDP packet.
FIG. 6 is a diagram showing an example of a case where a TTL authentication code is stored as optional data of an IP packet.
FIG. 7 is a diagram showing an example in which a TTL authentication code is stored in a data area of a packet.

FIG. 5 is a diagram showing details of a UDP header. Reference numeral 231 denotes a delivery source port showing a port of delivery source; and 232 a delivery destination port showing a port of delivery destination; 233 denotes a length showing a size of a UDP packet; and 234 a checksum showing a checksum of the data.

Here, TTL is originally a value that shows the lifetime of a packet. However, it is practically difficult to predict accurate time and, it is designed to subtract "1" when the packet transmission time is 1 second or below. In addition, since, in most cases, time required for transmitting a packet is very short, a subtraction process to simply subtract "1" from TTL is executed. Therefore, the TTL after being created or updated by the delivery source terminal 110 or the router 120 implies the number of times capable of transmitting the packet through other routers or the delivery destination terminal 130 across the networks. The TTL received by a router or the delivery destination terminal 130 implies the number of possible transmission times that was created or updated by the delivery source terminal 110 as a transfer source or other routers across the networks. It should be noted that the term "the number of hops" is sometimes used instead of the term "TTL", but it has the same meaning as TTL.

FIG. 6 illustrates a case as an example where a TTL authentication code which is a feature of the present invention is stored in the option 223 as shown in FIG. 4. Reference numeral 241 denotes an authentication code identifier to identify a TTL authentication code; 242 a data size showing the length of a TTL authentication code; 243 a TTL authentication code generated by using TTL and an authentication code key; and 244 optional data which is other optional data such as routing data. Here, it is possible to uniquely define the authentication code identifier 241 so that it can be differentiated from other optional identifiers, and further, identify the beginning of a subsequent option by showing the length with the data size 242. Other options can, therefore, be used without any problems even if the TTL authentication code is stored in the option 223.

FIG. 7 illustrates a case as an example where a TTL authentication code is stored in the data 203 shown in FIG. 3. Descriptions on the authentication code identifier 241, the data size 242 and the TTL authentication code 243 remain the same as descriptions on FIG. 6. Reference numeral 245 is data containing encrypted content. In this case, since the format of data to be stored in the data 203 is not defined, it is necessary to associate the data with the delivery source address 221 shown in FIG. 4 and the delivery source port 231 shown in FIG. 5, for example, and define in advance that a TTL authentication code is appended to data to be transmitted under and through the address and the port. The association may be performed fixedly with a specific port or may be done at application levels. Such association makes it possible to identify that the TTL authentication code 243 has been stored using the authentication code identifier 241 as described with FIG. 6, and that from which location the data 245 of encrypted content is stored using the data size 242 as described with FIG. 6.

Since the above-described configuration ensures verification of TTL and an authentication code related to the TTL with a router connecting networks, it becomes possible to make it difficult to fraudulently falsify TTL and adequately limit the delivery range of content, thus enabling prevention of content delivery to the unspecified number of persons. It should be nodded, however, that, with the configuration, an authentication code key and an algorithm of Hash function that are required to generate an authentication code must be handled as confidential data. Toward this end, the authentication code key and the algorithm of Hash function should be mounted on a router or a delivery source terminal that operate rightly, and further, such data must be managed so as not to be easily analyzed by users.

Second Embodiment

FIG. 8 is a diagram showing a configuration example of a content delivery system according to a second embodiment, wherein reference numeral 101 denotes a delivery source network to which a terminal delivering content is connected; and 102 a delivery destination network to which a terminal adapted to receive the content is connected. Reference numeral 110 denotes a delivery source terminal adapted to deliver content; 111 a delivery controller which controls delivery of content; 112 a packet creation unit which creates a packet to be transmitted to the networks; 113*a* device authentication controller which authenticates a device of a delivery destination terminal; 114 content encryption unit which encrypts content; 115 content to be delivered. Reference numeral 117 is an authentication code key area which stores a TTL authentication code. The authentication code key area 117 is allocated on a storage device. Reference numeral 118 denotes a terminal and router authentication unit which authenticates a router through which encrypted content is delivered or a terminal which receives the encrypted content; 120*a* router which connects networks; 121 a routing controller which controls transmission of content between networks; 122 a routing table which stores rules for permitting or prohibiting data transmission between networks; and 123 an authentication code generation & verification unit which generates or verifies an authentication code. Reference numeral 125 denotes an authentication code key table which stores a plurality of authentication code keys which is data each for generating an authentication code of TTL contained in a header. The authentication code key table 125 is allocated on a storage device. Reference numeral 126 denotes a terminal and router authentication unit which authenticates a router through which encrypted content is delivered or a terminal which receives the encrypted content; and 130 a delivery destination terminal which receives content. Hereinafter, descriptions will be made using above-stated reference numerals applied to respective constituent elements.

First, upon receiving a request for delivery of content from the delivery destination terminal 130, the delivery source terminal 110 checks the route up to the delivery destination terminal 130 and detects the presence of routers. When the router 120 exists on the route as shown in FIG. 8, the terminal and router authentication unit 118 authenticates at least the router 120 which transmits the content. At this time, a mutual authentication may be executed between the router 120 and the delivery source terminal 110. The authentication is actually executed by the terminal and router authentication unit 118 of the delivery source terminal 110 and the terminal and router authentication unit 126 of the router 120.

When authentication is successfully completed between the terminal and router authentication unit 118 and the terminal and router authentication unit 126, an exchange key which is used when an authentication code key is exchanged safely is mutually shared by the two units. Details of this process will be described later. Then, the terminal and router authentication unit 118 generates an authentication code key by using random numbers, etc. and stores it in the authentication code key area 117. Next, the terminal and router authentication unit 118 encrypts the authentication code key by using the exchange key and transmits the encrypted authentication code key to the terminal and router authentication unit 126 of the router 120 together with data of an address and a port of the delivery source terminal which delivers the content as well as that of an address and a port of the delivery destination terminal. The terminal and router authentication unit 126 decrypts the encrypted authentication code key by using the shared exchange key, stores the decrypted authentication code key in the authentication code key table 125 after associating the authentication code key with the address and the port of the delivery source terminal and the address and the port of the delivery destination terminal. With such arrangement, it is possible to share an authentication code key between the router 120 which is on the route through which content is delivered and the delivery source terminal 110.

Next, the device authentication controller 113 authenticates the delivery destination terminal 130. At this time, the delivery destination terminal 130 authenticates the delivery source terminal 110, if required. When the authentication process has not been executed successfully, no further processes will be executed, and no content will be delivered. When the delivery destination terminal 130 has been authenticated successfully, the device authentication controller 113 enables data for generating a key to encrypt content to be shared between the delivery destination terminal 130 and the delivery source terminal 110.

When the content is delivered, the content encryption unit 114 generates a content key to encrypt the content by using data for generating a key to encrypt content, reads the content 115 required, and encrypts the content with the content key.

Next, the packet creation unit 112 generates a header to transmit the content to the networks and creates a packet. The header contains an address and a port of a delivery destination terminal, an address and a port of a delivery source terminal, and TTL which specifies the number of routers through which the content can pass. In addition, the packet creation unit 112 generates an authentication code concerning the TTL by using the authentication code key stored in the authentication code key area 117 to enable detection of possible falsification of TTL, and adds the authentication code to the header.

When the packet is created, the delivery controller 111 transmits the packet containing encrypted content to the delivery source network. Since the delivery destination terminal 130 is not connected to the delivery source network 101, the delivery controller 111 delivers the packet to the router 120.

When the router 120 receives the packet transmitted from the delivery source terminal 110, the routing controller 121 first picks up an address and a port of delivery destination as well as an address and a port of delivery source, and checks whether transmission of the packet is permitted or not prohibited by referring to the routing table 122. When the transmission is not permitted, packet transfer is not executed and the packet is discarded. When the transmission is permitted and not prohibited, the authentication code generation & verification unit 123 verifies the TTL value. The authentication code generation & verification unit 123 picks up the TTL value and the TTL authentication code from the header, and reads the authentication code key that is associated with TTL, an address and a port of delivery source and an address and a port of delivery destination and that is stored in the authentication code key table 125 first. Then, the unit 123 generates an authentication code by using a Hash function, and compares the authentication code with the TTL authentication code picked up from the packet header to verify that the two codes have the same value.

When the comparison result reveals the same value, the authentication code generation & verification unit 123 subtracts the value "1" from the TTL value. If the subtraction results in the value "0", this means the content cannot pass through further routers, and the authentication code generation & verification unit 123 discards the packet and notifies the delivery source terminal 110 of such discarding. If the TTL value is "1" or over after the subtraction, the authentication code generation & verification unit 123 newly generates a TTL authentication code by applying a Hash function to the TTL value after subtraction and the authentication code key, and modifies TTL and the TTL authentication code in the packet. The routing controller 121 transmits the packet having the TTL and the TTL authentication code thus modified to the delivery destination network 102. The routing controller 121 may practically set the TTL and the TTL authentication code in the packet.

When the packet is sent to the delivery destination network 102, the delivery destination terminal 130 receives the packet. The delivery destination terminal 130 that has received the packet generates a content key based on data for generating a key to encrypt content shared through the device authentication, and decrypts the encrypted content contained in the packet by using the content key to use the content.

With such arrangement, falsification can be prevented at a higher level as compared with a case where when the authentication code key is fixed, the authentication code fixed at the TTL value is generated. The reason is that since the authentication code can be varied every time authentification code key is authenticated, the TTL authentication code is varied for each authentication without being fixed at the TTL value.

Next, a detailed configuration of the authentication code key table 125 will be described with reference to FIG. 9. Referring to FIG. 9, reference numeral 151 denotes a delivery source IP address showing a delivery source address of content; 152 a delivery source port showing a delivery source port of content; 153 a delivery destination IP address showing a delivery destination address of content; 154 a delivery destination port showing a delivery destination port of content; and 155 an authentication code key. As shown in FIG. 9, the authentication code key 155 is stored after being associated with data identifying connection of a delivery source and a delivery destination. Data identifying the connection in the example are the delivery source IP address 151, the delivery source port 152, the delivery destination IP address 153 and the delivery destination port 154. With such management, it is possible for the router 120, upon receiving a content packet, to check an address and a port of delivery source as well as an address and a port of delivery destination that are contained in the packet header. If check has been made whether any pertinent authentication code key exists in the authentication code key table 125, the router 120 can generate an authentication code when verifying the authentication code or varying TTL by using the associating authentication code key.

Next, an authentication example concerning TTL between a router and a delivery source terminal will be described with reference to FIG. 10. Here, symbol Ko is a public key issued by a certificate authority used to verify authorization data, K1$o$ is a public key of a public key cryptosystem to be managed by a delivery source terminal, Klp is a private key of a public key cryptosystem to be managed by a delivery source terminal, K2$o$ is a public key of a public key cryptosystem to be managed by a router, and K2$p$ is a private key of a public key cryptosystem to be managed by a router.

First, when authentication is initiated, the terminal and router authentication unit 118 of the delivery source terminal 110 transmits terminal authentication data which is authentication data of the unit itself and the public key K1$o$ to the terminal and router authentication unit 126 of the router 120 (Step T001). Subsequently, the router 120 authenticates the terminal authentication data by using the public key Ko issued by a certificate authority and authenticate the delivery source terminal 110 (T002). Then, the router 120 generates a random number N2 and encrypts the random number by using the public key K1$o$ of the delivery source terminal 110 (T003). When the above-stated processes are completed, the router 120 transmits the router authentication data which is the authentication data of the router itself, the public key K2$o$ and the encrypted random number N2 to the delivery source terminal 110 (T004). Symbol "E (K1$o$, N2)" implies the random number N2 that is encrypted by using the public key K1$o$.

Subsequently, the delivery source terminal 110 authenticates the router authentication data by using the public key Ko issued by a certificate authority and authenticates the router 120 (T005). Then, the delivery source terminal 110 decrypts the encrypted random number N2 by using the private key K1$p$ of the delivery source terminal 110 (T006). Thereafter, the delivery source terminal 110 generates a random number N1 and encrypts N1 by using the public key K2$o$ of the router 120 (T007). When the above-stated processes are completed, the delivery source terminal 110 transmits the encrypted random number N1 to the router 120 (T008).

Subsequently, the router 120 decrypts the random number N1 by using the private key K2*p* of the router 120 (T009). When all the processes so far described are completed, the random numbers N1 and N2 are shared between the router 120 and the delivery source terminal 110. Then, an exchange key "Kauth" is generated using these random numbers as arguments (T010, T011). The exchange key "Kauth" is used as a code for transmitting the authentication code key by using an algorithm shared between the router 120 and the delivery source terminal 110. Next, the delivery source terminal 110 generates an authentication code key by using random numbers, etc. (T012). Then, the delivery source terminal 110 encrypts the authentication code key by using the exchange key "Kauth", and sends the encrypted authentication code key to the router 120 together with an address and a port of delivery source as well as an address and a port of delivery destination (T013). Subsequently, the router 120 decrypts the authentication code key by using the exchange key "Kauth" (T014).

As stated above, since the authentication code key is encrypted before being transmitted, and the exchange key used for the encryption is generated based on random numbers generated respectively by the delivery source terminal 110 and the router 120, a different exchange key is generated for each connection process. The exchange key can be known only by a router and a delivery source terminal, and therefore, it is difficult to find the authentication code key only by observing signals from the outside.

FIG. 11 is a diagram showing an example of a system configuration in which content is transmitted via a plurality of routers. Referring to FIG. 11, reference numeral 140 denotes a router which connects the networks 102 and 103; 141 a routing controller which controls content transmission between the networks; 142 a routing table which stores rules to permit or prohibit data transmissions between the networks; and 143 an authentication code generation & verification unit which generates and verify an authentication code. Reference numeral 145 denotes an authentication code key table which stores a plurality of authentication code keys that are data for generating TTL authentication codes contained in headers. The authentication code key table 145 is stored in a storage device. Reference numeral 146 denotes a terminal and router authentication unit which authenticates a router through which encrypted content is transmitted or a terminal which receives encrypted content. Reference numeral 103 denotes a network connecting the routers 120 and 140.

First, upon receiving a request for delivery of content from the delivery destination terminal 130, the delivery source terminal 110 checks the route up to the delivery destination terminal 130 and detects if routers exist. When the routers 120 and 140 exist on the route as shown in FIG. 11, authentication is first made with the router 120.

When authentication is successfully completed between the terminal and router authentication unit 118 and the terminal and router authentication unit 126, an exchange key which is used when an authentication code key is exchanged safely is mutually shared by the two units. Then, the terminal and router authentication unit 118 generates an authentication code key by using random numbers, etc. and stores it in the authentication code key area 117. Next, the terminal and router authentication unit 118 encrypts the authentication code key by using the exchange key and transmits the encrypted code key to the terminal and router authentication unit 126 of the router 120 together with data of an address and a port of the delivery source terminal which transmits the content as well as that of an address and a port of a delivery destination terminal. The terminal and router authentication unit 126 decrypts the encrypted authentication code key by using the shared exchange key, stores the decrypted authentication code key in the authentication code key table 125 after associating the code key with the address and the port of the delivery source terminal and the address and the port of the delivery destination terminal.

Next, the router 120 checks, by using the delivery destination address stored in the authentication code key table 125, if a delivery destination terminal having the address exists in the router-to-router network 103 to which the router 120 is to be connected. With the example shown in FIG. 11, since the delivery destination terminal 130 is not connected to the network 103, authentication is executed between the routers 120 and 140 in the similar manner as described above. Then, the router 120 encrypts the pertinent authentication code key in the table stored in the authentication code key table 125 with the shared exchange key, and transmits the encrypted authentication code key to the router 140 together with data on the address and the port of the delivery source terminal as well as the address and the port of the delivery destination terminal (corresponding to T013). The terminal and router authentication unit 146 decrypts the encrypted authentication code key by using the shared exchange key (corresponding to T014), and stores it in the authentication code key table 145 after associating the authentication key with the address and the port of the delivery source terminal as well as the address and the port of the delivery destination terminal. With such arrangement, it is possible to share the authentication code key among a plurality of routers that exist on the delivery route of content and a delivery source terminal.

Next, the device authentication controller 113 authenticates the delivery destination terminal 130. At this time, the delivery destination terminal 130 authenticates the delivery source terminal 110, if required. When the authentication process has not been executed successfully, no further processes will be executed, and no content will be delivered. When the delivery destination terminal 130 has been authenticated successfully, the device authentication controller 113 enables data for generating a key to encrypt content to be shared between the delivery destination terminal 130 and the delivery source terminal 110.

When delivering content, the content encryption unit 114 generates a content key to encrypt the content by using data for generating a key to encrypt content, reads the content 115 requested, and encrypts the content with the content key.

Next, the packet creation unit 112 generates a header to transmit the content to the networks and creates a packet. The header contains an address and a port of a delivery destination terminal, an address and a port of a delivery source terminal, and TTL which specifies the number of routers through which the content can pass. In addition, the packet creation unit 112 generates an authentication code concerning the TTL by using the authentication code key stored in the authentication code key storage area 117 to enable detection of possible falsification of the TTL, and adds the authentication code to the header.

When the packet is created, the delivery controller 111 transmits the packet containing the encrypted content to the delivery source network. Since the delivery destination terminal 130 is not connected to the delivery source network 101, the delivery controller 111 transmits the packet to the router 120.

When the router 120 receives the packet sent from the delivery source terminal 110, the routing controller 121 first picks up an address and a port of delivery destination as well as an address and a port of delivery source, and checks whether transmission of the packet is permitted or not prohibited by referring to the routing table 122. When transmission is not permitted, packet transfer is not executed and the packet is discarded. When transmission is permitted and not prohibited, the authentication code generation & verification unit 123 verifies the TTL value. The authentication code generation & verification unit 123 picks up the TTL value and the TTL authentication code from the header; first reads the authentication code key that is associated with the TTL, an address and a port of delivery source and an address and a port of delivery destination and that is stored in the authentication code key table 125; generates an authentication code by using a Hash function; and compares the authentication code with the TTL authentication code picked up from the packet header to verify that the two codes have the same value.

When the comparison result reveals the same value, the authentication code generation & verification unit 123 subtracts the value "1" from the TTL value. If the subtraction results in the value "0", this means the content cannot pass through further routers, and the authentication code generation & verification unit 123 discards the packet and notifies the delivery source terminal 110 of such discarding. If the TTL value is "1" or over after the subtraction, the authentication code generation & verification unit 123 newly generates a TTL authentication code by applying a Hash function to the TTL value after subtraction and the authentication code key, and modifies TTL and the TTL authentication code in the packet. The routing controller 121 transmits the packet having the TTL and the TTL authentication code thus modified to the router-to-router network 103. The routing controller 121 may practically set the TTL and the TTL authentication code in the packet.

When the packet is sent to the router-to-router network 103, the router 140 receives the packet. In the similar manner as stated above, the router 140 refers to the routing table 142, and, if transmission is permitted, the authentication code generation & verification unit 143 executes the TTL verification, TTL update and authentication code update, modifies the packet authentication code, and allows the routing controller 141 to transmit the packet to the delivery destination network 102.

When the packet is sent to the delivery destination network 102, the delivery destination terminal 130 receives the packet. The delivery destination terminal 130 that has received the packet generates a content key based on data for generating a key to encrypt content shared through the device authentication process, and decrypts the encrypted content contained in the packet by using the content key to use the content.

With such arrangement, content can be delivered with a TTL authentication code appended even in a case where the content is transmitted via a plurality of routers.

Third Embodiment

FIG. 12 is a diagram showing a configuration of a content delivery system according to a third embodiment. Referring to FIG. 12, reference numeral 104 is a network to which a delivery source terminal and a delivery destination terminal are connected; 119 a TTL authentication code verification unit which detects if the network is adapted to the verification of TTL authentication code; 131 a receiving controller which receives a network packet; 132 an authentication code verification unit which verifies the TTL authentication code; 134 a content decryption unit which decrypts encrypted content; 135 a content decoding unit which decodes content; 137 an authentication code key area which stores an authentication code key; and 138 a terminal and router authentication unit which authenticates a terminal or a router. Hereinafter, descriptions will be made of operation using above-stated reference numerals applied to respective constituent elements.

First, upon receiving a request for delivery of content from the delivery destination terminal 130, the delivery source terminal 110 checks the route up to the delivery destination terminal 130 and detects if a router exists. When the delivery destination terminal 130 exists on the network 104 as shown in FIG. 12, the terminal and router authentication unit 118 authenticates the delivery destination terminal 130 to which the content is transmitted. The authentication is actually executed by the terminal and router authentication unit 118 of the delivery source terminal 110 and the terminal and router authentication unit 138 of the delivery destination terminal 130.

When authentication is successfully completed between the terminal and router authentication unit 118 and the terminal and router authentication unit 138, an exchange key which is used when an authentication code key is exchanged safely is mutually shared by the two units. Then, the terminal and router authentication unit 118 generates an authentication code key by using random numbers, etc. and stores it in the authentication code key area 117. Next, the terminal and router authentication unit 118 encrypts the authentication code key by using the exchange key and transmits the encrypted authentication code key to the terminal and router authentication unit 138 of the delivery terminal 130 together with data of an address and a port of a delivery source terminal which transmits the content as well as that of an address and a port of a delivery destination terminal. The terminal and router authentication unit 138 decrypts the encrypted authentication code key by using the shared exchange key, and stores the decrypted authentication code key in the authentication code key area 137. With such arrangement, it is possible to share an authentication code key between the delivery destination terminal 130 to which the content is delivered and the delivery source terminal 110.

Next, the device authentication controller 113 authenticates the delivery destination terminal 130. When the authentication process has not been executed successfully, no further processes will be executed, and no content will be delivered. When the delivery destination terminal 130 has been authenticated successfully, the device authentication controller unit 133 of the delivery destination terminal 130 and the device authentication controller 113 of the delivery source terminal 110 shares data for generating a key to encrypt the content.

When delivering content, the content encryption unit 114 generates a content key to encrypt the content by using data for generating a key to encrypt content, reads the content 115 required, and encrypts the content with the content key.

Next, the packet creation unit 112 generates a header to transmit the content to a network and creates a packet. The header contains an address and a port of a delivery destination terminal, an address and a port of a delivery source terminal, and TTL which specifies the number of routers through which the content can pass. In addition, the packet creation unit 112 generates an authentication code concerning the TTL by using the authentication code key stored in the authentication code key area 117 to enable detection of possible falsification of the TTL, and adds the authentication code to the header. When the packet is created, the delivery controller 111 transmits the packet containing the encrypted content to the network 104.

When the packet is transmitted to the network 104, the receiving controller 131 of the delivery destination terminal 130 receives the packet. The authentication code verification unit 132 of the delivery destination terminal 130 that received the packet picks up the TTL and the authentication code contained in the packet, generates an authentication code by using the authentication code key stored in the authentication code key area 137 and a Hash function, and compares the authentication code with the authentication code picked up from the packet to verify the received authentication code. If the verification is not executed successfully, the authentication code verification unit 132 judges that the delivery is not made from a right terminal, and discards the packet. When the verification is executed successfully, the content decryption unit 134 generates a content key based on data for generating a content encryption key shared through device authentication process, and decrypts the encrypted content. Next, the content decoding unit 135 decodes the content to use the content.

As stated above, the delivery destination terminal can also judge if the content is delivered from a right terminal by verifying the TTL authentication code, which enables to control the system not to use content delivered from a fraudulent terminal, thus enabling prevention of fraudulent use of content. In addition, with the third embodiment, a router is not provided in the delivery route. However, it can be easily understood by those skilled in the art that, even when the content is delivered via one or more routers, the router or the delivery destination terminal can authenticate the other side between them, in addition to the verification of the TTL authentication code by the delivery destination terminal. With such arrangement, it is possible to prevent use of content for a case where content is delivered via routers which cannot verify the TTL authentication code.

In addition, for a case where the router connected to the network 104 is the conventional router 20 which does not verify the TTL authentication code, the TTL authentication code verification unit 119 of the delivery source terminal 110 judges that the router 20 cannot verify the TTL authentication code, since authentication is not performed successfully between the terminal and router authentication unit 118 and the router 20. Consequently, when delivering content, the packet creation unit 112 can limit content delivery to the network 104 by delivering the content after setting "1" to the TTL. With such configuration, it is possible to prevent delivery of content via a router which cannot verity TTL.

We claim:

1. A content delivery device to deliver content via a network, said content delivery device comprising:

a storage device storing an authentication code key which is data for generating an authentication code to verify validity of a number of possible transmission times of content;

a device authentication controller authenticating a delivery destination device of said content;

a packet creation unit, in response to the delivery destination device being a delivery destination terminal, successfully authenticating said delivery destination device by said device authentication controller, generating said authentication code based on said number of possible transmission times and said authentication code key, and in response to the delivery destination device being a router, unsuccessfully authenticating said delivery destination device by said device authentication controller, limiting said number of possible transmission times, such that transmitting said content to said delivery destination device is avoided;

said packet creation unit further configuring said number of possible transmission times and said generated authentication code in a packet including said content; and a delivery controller transmitting said packet to said delivery destination device of said content.

2. A content delivery device according to claim 1, further comprising:

an authentication unit encrypting said authentication code key by using an exchange key to be shared with said delivery destination device of said content via said network, said exchange key and said authentication code key being generated for a connection with said delivery destination device; and a transmitting unit transmitting to said delivery destination device said encrypted authentication code key and data for identifying said connection with said delivery destination device.

3. A content delivery device according to claim 2, wherein said number of possible transmission times is one when said connection cannot share said exchange key with said delivery destination device.

4. A content delivery device according to claim 1, wherein:

said authentication code is configured in a header of said packet.

5. A content delivery device according to claim 1, wherein:

said authentication code is configured in a data area of said packet.

* * * * *